United States Patent
Khesin

(10) Patent No.: US 9,405,899 B2
(45) Date of Patent: Aug. 2, 2016

(54) SOFTWARE PROTECTION MECHANISM

(75) Inventor: Oscar Khesin, San Jose, CA (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/583,706

(22) PCT Filed: Jun. 6, 2012

(86) PCT No.: PCT/US2012/041065
§ 371 (c)(1),
(2), (4) Date: Sep. 10, 2012

(87) PCT Pub. No.: WO2013/184108
PCT Pub. Date: Dec. 12, 2013

(65) Prior Publication Data
US 2013/0333033 A1    Dec. 12, 2013

(51) Int. Cl.
*G06F 21/00* (2013.01)
*G06F 21/55* (2013.01)
*G06F 21/56* (2013.01)

(52) U.S. Cl.
CPC .............. *G06F 21/55* (2013.01); *G06F 21/566* (2013.01)

(58) Field of Classification Search
None
See application file for complete search history.

(56) References Cited

U.S. PATENT DOCUMENTS

| | | | |
|---|---|---|---|
| 5,581,696 A * | 12/1996 | Kolawa | G06F 11/3624 714/38.1 |
| 6,643,613 B2 | 11/2003 | McGee et al. | |
| 6,668,325 B1 | 12/2003 | Collberg et al. | |
| 7,240,332 B2 * | 7/2007 | Berg et al. | 717/126 |
| 7,665,138 B2 | 2/2010 | Song et al. | |
| 7,925,600 B2 | 4/2011 | Hinchey et al. | |
| 7,996,685 B2 | 8/2011 | Jin et al. | |
| 8,032,936 B2 | 10/2011 | Yodaiken | |
| 8,321,942 B1 * | 11/2012 | Chiueh et al. | 726/24 |
| 2002/0100022 A1 * | 7/2002 | Holzmann | G06F 11/3608 717/126 |
| 2003/0056200 A1 * | 3/2003 | Li | G06F 11/3612 717/128 |
| 2003/0110007 A1 | 6/2003 | McGee et al. | |
| 2005/0010895 A1 * | 1/2005 | Reddappagari | G06F 8/10 717/106 |
| 2005/0240999 A1 * | 10/2005 | Rubin et al. | 726/22 |
| 2005/0278703 A1 | 12/2005 | Lo et al. | |
| 2006/0130016 A1 * | 6/2006 | Wagner | G06F 9/4812 717/136 |
| 2006/0259967 A1 * | 11/2006 | Thomas et al. | 726/22 |
| 2007/0169028 A1 * | 7/2007 | Kasten et al. | 717/140 |
| 2008/0250018 A1 * | 10/2008 | Geffner et al. | 707/6 |
| 2010/0031353 A1 | 2/2010 | Thomas et al. | |
| 2010/0106348 A1 | 4/2010 | Hinchey et al. | |
| 2010/0131721 A1 * | 5/2010 | Title et al. | 711/154 |

(Continued)

OTHER PUBLICATIONS

Park et al., "Fast malware classification by automated behavioral graph matching". In Proceedings of the Sixth Annual Workshop on Cyber Security and Information Intelligence Research (CSIIRW '10), ACM, 2010, p. 1-4.*

(Continued)

*Primary Examiner* — Jeffery Williams
(74) *Attorney, Agent, or Firm* — Dorsey & Whitney LLP

(57) ABSTRACT

Techniques for detecting malware activity are described. In some examples, a method for monitoring executing software for malware may include monitoring behavior of software during execution. Based on comparison of the monitored behavior and corresponding expected behavior derived from analysis of the software, it may be determined that the monitored behavior deviates from the expected behavior in accordance with a predetermined trigger. An appropriate action may be initiated in response.

21 Claims, 6 Drawing Sheets

(56) References Cited

U.S. PATENT DOCUMENTS

| | | | |
|---|---|---|---|
| 2010/0263050 A1 | 10/2010 | Kang | |
| 2010/0333203 A1* | 12/2010 | Tsviatkou et al. | 726/23 |
| 2011/0054918 A1 | 3/2011 | Hamilton, II et al. | |
| 2011/0219449 A1 | 9/2011 | St. Neitzel et al. | |
| 2011/0265182 A1 | 10/2011 | Peinado et al. | |
| 2011/0302424 A1 | 12/2011 | Horne et al. | |
| 2012/0079596 A1* | 3/2012 | Thomas et al. | 726/24 |
| 2012/0233165 A1* | 9/2012 | Kirkpatrick | 707/737 |
| 2013/0117853 A1* | 5/2013 | Tsviatkou et al. | 726/23 |
| 2013/0227636 A1* | 8/2013 | Bettini et al. | 726/1 |
| 2013/0347094 A1* | 12/2013 | Bettini et al. | 726/11 |
| 2015/0310212 A1* | 10/2015 | Green | G06F 21/566 726/24 |

OTHER PUBLICATIONS

Christodorescu et al., "Static analysis of executables to detect malicious patterns". In Proceedings of the 12th conference on USENIX Security Symposium—vol. 12 (SSYM'03), vol. 12. USENIX Association, Berkeley, CA, USA, p. 1-21.*

Hu et al., "Large-scale malware indexing using function-call graphs". In Proceedings of the 16th ACM conference on Computer and communications security (CCS '09). ACM, 2009, p. 1-10.*

Raber, et al., "Deobfuscator: an Automated Approach to the Identification and Removal of Code Obfuscation", Riverside Research Institute, 2007, p. 1, 2.*

Cloud Security Alliance (CSA), "Security Guidance for Critical Areas of Focus in Cloud Computing V2.1," © Cloud Security Alliance, Dec. 2009, 76 pages.

Cloud Security Alliance (CSA), "Top Threats to Cloud Computing V1.0," © Cloud Security Alliance, Mar. 2010, 14 pages.

Harsh, M., "Security Issues with Cloud Computing," http://www.thewindowsclub.com/security-issues-with-cloud-computing, Jan. 30, 2011, 3 pages.

International Patent Application No. PCT/US2012/041065: International Search Report and Written Opinion dated Jul. 24, 2012, 13 pages.

King et al., "SubVirt: Implementing malware with virtual machines," Proceedings of the 2006 IEEE Symposium on Security and Privacy, May 2006, 314-327.

Wang et al., "Countering Kernel Rootkits with Lightweight Hook Protection," CCS '09 Proceedings of the 16th ACM conference on Computer and communications security, Nov. 9-13, 2009, 545-554.

Wikipedia, "Hypervisor," http://en.wikipedia.org/w/index.php?title=Hypervisor&oldid=378340737, Aug. 11, 2010, 5 pages.

* cited by examiner

SOFTWARE PROTECTION MECHANISM

CROSS-REFERENCE TO RELATED APPLICATION

This application is the National Stage under 35 U.S.C. §371 of International Application No. PCT/US2012/041065, filed Jun. 6, 2012, the disclosure of which is incorporated herein by reference in its entirety.

BACKGROUND

Detection of compromised programs and malware has been a concern throughout the era of computers. With the growth of communication networks such as the Internet and the increasing amount of data interchange as well as the recent growth of cloud computing, the infection of computers and servers through communications or file exchanges is an increasingly significant concern. Infections of computers and servers can take various forms but are typically related to computer viruses, Internet or other network worms, Trojan programs, and other forms of malicious code.

The infection of computers by malicious code is a significant concern in cloud computing. Cloud computing refers to a computing environment for enabling on-demand network access to a shared pool of computing resources. Many cloud computing services involve virtualized resources, and software associated with managing virtualized resources may be a desirable target of malware. Programs such as a virtual machine monitor (VMM) are an important software layer in cloud computing host servers and therefore may be a desirable target for malware and code modification by online attackers attempting to acquire, control, and manipulate guest virtual machines or launch fraudulent virtual machines. Potential customers may be reluctant to utilize cloud services because of the risks associated with such compromised software. Additional solutions are needed to make cloud hosting software, and in particular its important components such as the VMM, more secure from malware and code modifications.

SUMMARY

Various techniques for detecting computer malware are disclosed herein. Methods and systems are disclosed for monitoring software behavior to detect malware activity. Such methods and systems may be used, for example, to detect malware activity in a VMM and other software components of cloud servers by interacting with the operating system of the server and monitoring for potentially malicious behavior.

In some embodiments, a method for monitoring executing software for malware may include monitoring behavior of software during execution. Based on comparison of the monitored behavior and corresponding expected behavior derived from analysis of the software, it may be determined that the monitored behavior deviates from the expected behavior in accordance with a predetermined trigger. An appropriate action may be initiated in response.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
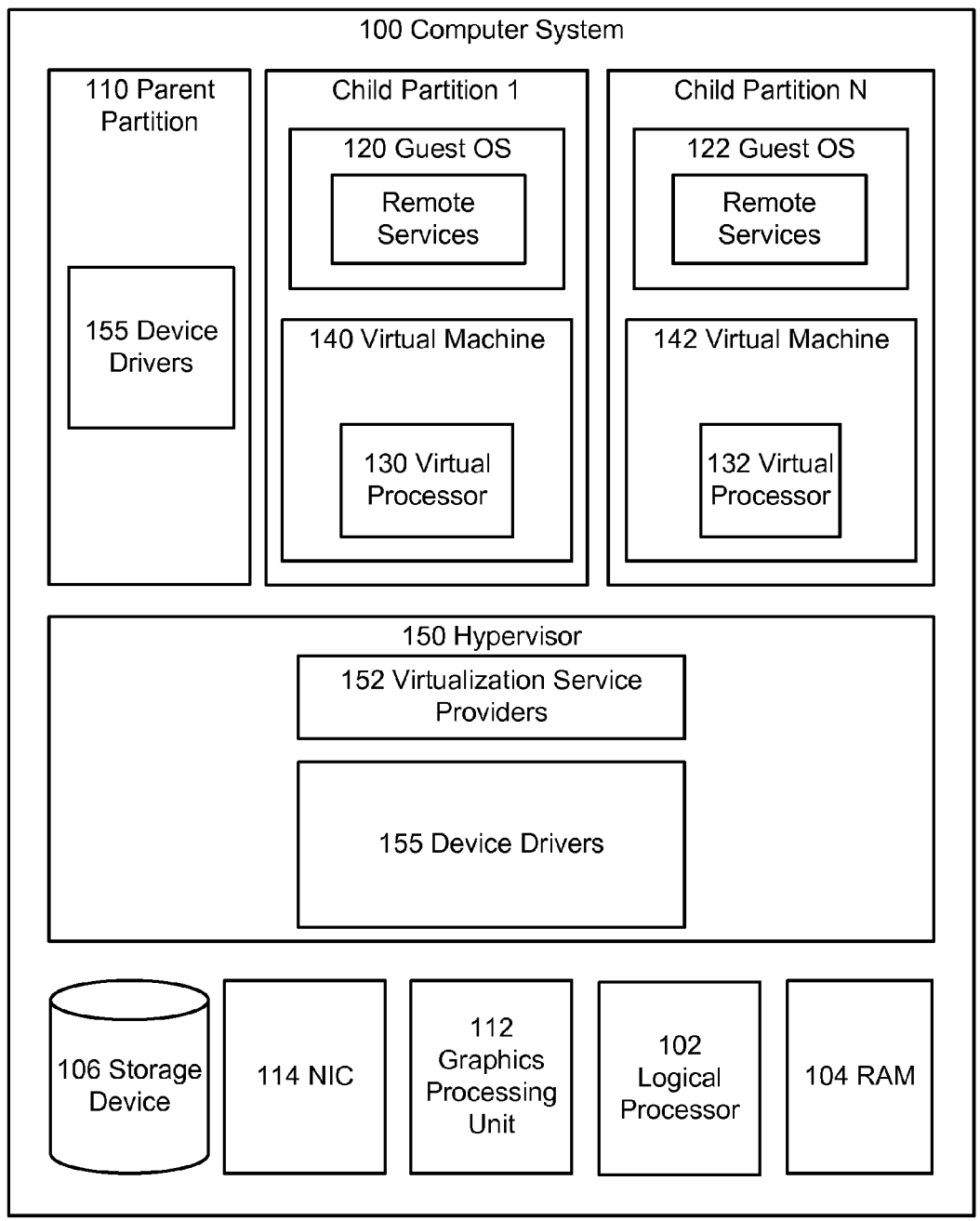
FIG. 1 depicts an example computing environment wherein aspects of the present disclosure can be implemented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

In an illustrative embodiment, any of the operations, processes, etc., described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs.

efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, alternatively, the implementer may opt for some combination of hardware, software, and/or firmware.

One skilled in the art will appreciate that, for this and other processes and methods disclosed herein, the functions performed in the processes and methods may be implemented in differing orders. Furthermore, the outlined steps and operations are only provided as examples; some of the steps and operations may be optional, combined into fewer steps and operations, or expanded into additional steps and operations without detracting from the essence of the disclosed embodiments.

FIG. 1 depicts an example computing environment wherein aspects of the present disclosure can be implemented. In particular, FIG. 1 and the following description are intended to provide a brief, general description of an example virtual computing environment in which the embodiments described herein may be implemented. Referring to FIG. 1, a computer system 100 may include a hypervisor 150 that can be configured to control and arbitrate access to the hardware of computer system 100. Hypervisor 150 can generate execution environments called partitions, such as, by way of example, child partition 1 through child partition N. Each child partition can be mapped to a set of hardware resources under the control of hypervisor 150. FIG. 1 also illustrates a parent partition 110 that can be configured to provide resources to guest operating systems executing in child partitions 1 through N using virtualization services. For example, virtualization service providers (VSPs) 152 in conjunction with device drivers 155 can be used to multiplex the interfaces to the hardware resources. Each child partition 1 through N can include one or more virtual processors, such as virtual processors 130 through 132 that guest operating systems 120 through 122 can manage and schedule threads to execute thereon. Generally, virtual processors 130 through 132 may comprise executable instructions and associated state information that provide a representation of a physical processor with a specific architecture. Virtual processors 130 through 132 in this example can be mapped to a logical processor 102 of computer system 100 such that the instructions that effectuate virtual processors 130 through 132 are mapped to and/or executed by logical processor 102 and other hardware resources of computer system 100—such as a storage device 106, a network interface card (NIC) 114, a graphics processing unit 112, and a random access memory (RAM) 104. Thus, in these example embodiments, multiple virtual processors can be simultaneously executing while, for example, another logical processor is executing virtualization system instructions. Generally speaking, and as illustrated by the figure, the combination of virtual processors and memory in a partition can be considered a virtual machine such as virtual machines 140 and 142.

Generally, guest operating systems 120 through 122 can include any operating system such as, for example, operating systems from Microsoft®, Apple®, an open source community, etc. The guest operating systems can operate in various modes, including user mode and kernel mode, and can have kernels that can include schedulers, memory managers, etc. A kernel mode can include an execution mode in logical processor 102 that grants access to privileged processor instructions. Each guest operating system 120 through 122 can have associated file systems that can have applications stored thereon such as terminal servers, e-commerce servers, email servers, etc., or the guest operating systems themselves. Guest operating systems 120 through 122 can schedule threads to execute on virtual processors 130 through 132 and instances of such applications can be effectuated.

Figure 2:
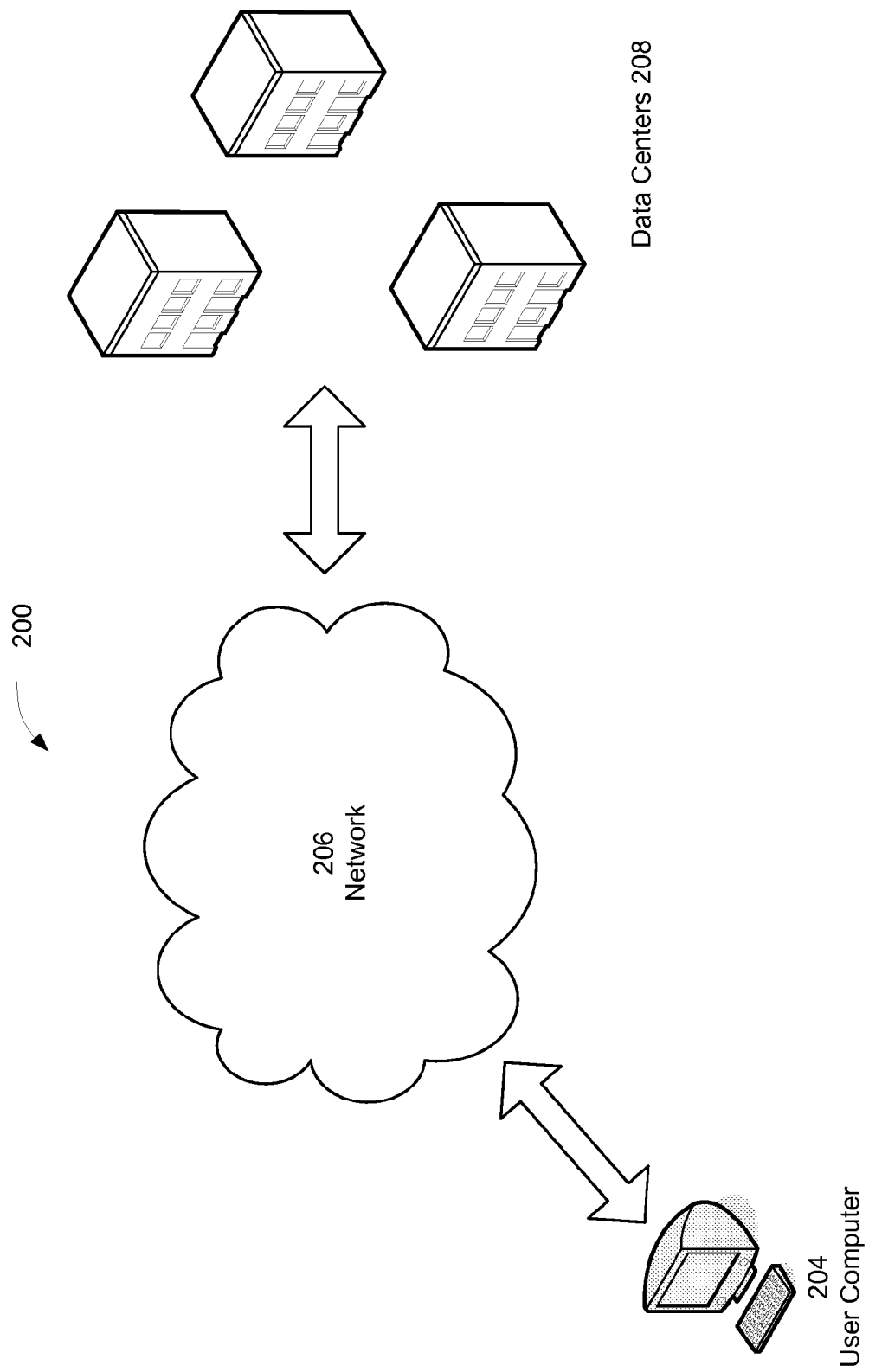
FIG. 2 depicts an example computing environment wherein aspects of the present disclosure can be implemented.

FIG. 2 depicts an example computing environment wherein aspects of the present disclosure can be implemented. In particular, FIG. 2 depicts an operating environment 200 that includes data centers 208 that provide computing resources to customers. The computing resources provided by data centers 208 may include various types of resources such as data processing resources and data storage resources. In some embodiments, the data processing resources may be provided by one or more virtual machines such as virtual machine 140 or 142 described above in conjunction with FIG. 1. The virtual machines may be configured to execute applications.

The customers of data centers 208 may access the computing resources provided by data centers 208 over a network 206. It should be appreciated that a local-area network (LAN), the Internet, or any other networking topology known in the art that connects data centers 208 to remote consumers may be utilized. It should also be appreciated that combinations of such networks might also be utilized.

A user computer 204 may be a computer utilized by a customer or other consumer of data centers 208. For instance, user computer 204 may be a server computer, a desktop or laptop personal computer, a thin client, a tablet computer, a wireless telephone, a personal digital assistant (PDA), an e-reader, a game console, or any other computing device capable of accessing data centers 208.

Cloud computing generally refers to a computing environment for enabling on-demand network access to a shared pool of computing resources (e.g., applications, servers, and storage) such as those described above. Many cloud computing services involve virtualized resources, such as those described above, and may take the form of web-based tools or applications that users can access and use through a web browser as if they were programs installed locally on their own computers.

A virtual machine manager or virtual machine monitor (VMM) is a virtualization component that allows multiple guest operating systems to run concurrently on a host computer. A typical VMM may manage resources of the underlying hardware that provides virtualization services and provide an abstraction of one or more virtual machines. A virtual machine may run a complete operating system and a set of applications. Guest software including the guest OS and applications may run in user mode, and typically only the VMM runs in the privileged level (e.g., kernel mode). VMMs may export hardware-level abstractions to guest software using emulated hardware. The guest operating system may interact with the virtual hardware in the same manner as it would with real hardware (e.g., in/out instructions, DMA), and these interactions may be trapped by the VMM and emulated in software. This emulation allows the guest operating system to run without modification while maintaining control over the system at the VMM layer.

A VMM can support multiple OSs on one computer by multiplexing the computer's hardware and providing the illusion of multiple distinct virtual computers, each of which can run a separate operating system and its applications. The VMM may isolate resources of each virtual computer through redirection. For example, the VMM may map two virtual disks to different sectors of a shared physical disk, and the VMM may map the physical memory space of each virtual machine to different pages in the real machine's memory.

In addition to multiplexing a computer's hardware, VMMs may also provide a platform for adding services to an existing system. For example, VMMs may be used to debug operating systems and system configurations, migrate live machines, detect or prevent intrusions, and attest for code integrity. These virtualization services are typically implemented outside the guests they are serving in order to avoid impacting the guests.

The VMM, given that it may be an important software layer in host servers in a cloud computing service, can often become a target for malware and code modification by online attackers attempting to acquire, control, and manipulate guest virtual machines, or initiate certain dedicated harmful or fraudulent virtual machines. When the VMM is compromised by malware or code modification, the targeted system may see little or no difference in its memory space, disk space, or execution, depending on how completely the machine is virtualized. The compromised VMM may also isolate the malware's state and events from those of the target system, and software in the target system may not be able to see or modify the compromised software. Furthermore, the compromised VMM can see state and events in the target system such as keystrokes, network packets, disk state, and memory state and can observe and modify these states and events—without its own actions being observed—because the compromised VMM can control the virtual hardware presented to the operating system and applications.

A compromised VMM can be used as a convenient platform for developing malicious services. A malicious service can benefit from all of the conveniences of running in a separate general purpose operating system while remaining invisible to intrusion detection software running in the targeted system.

Detection of compromised programs or malware has been a concern throughout the era of the computers and computing. With the growth of communication networks such as the Internet and the increasing interchange of data including the recent growth of cloud computing, the infection of computers and servers through communications or file exchanges is an increasingly significant consideration. Infections take various forms, but are typically related to computer viruses, Internet or other network worms, Trojan programs, and other forms of malicious code.

One technique for detecting computer malware, including Internet worms and Trojans, is signature scanning. Signature scanning systems may use sample code patterns extracted from known malicious code and scan for the occurrence of these patterns in program code. One limitation of the signature analysis is that the method is a scanning technique and may not allow for detection of malware in real-time, which may be desired for mission critical or sensitive data clients.

In addition, the signature scanning method assumes a priori knowledge of the malware and thus may only allow for detection of known malicious code. That is, only code that matches the stored sample signatures of known malicious code may be identified. Viruses or malicious code not previously identified and viruses or malicious code created after the last update to the signature database may not be detected. Thus, newly created viruses may not be detected by this method. Furthermore, the scanning method may not detect malicious code in cases where the signature, previously extracted and contained in the signature database, has been overwritten.

The signature analysis technique may also fail to identify the presence of malware if the signature is not aligned in the code in an expected fashion. Additionally, the authors of the malware may obscure the identity of the virus by op-code substitution or by inserting dummy or random code into the malware code. Nonsense code can be inserted that alters the signature of the malware to an extent sufficient to render the malware undetectable by a signature scanning program and without diminishing the ability of the virus to propagate and deliver its payload. In addition, signature scanning may fail when malicious programs have similar code structures to benign application programs. In such a case, the signature scanner may generate large numbers of false positives or fail to detect the malicious code if the signature is abandoned.

Another malware detection strategy is integrity checking. Integrity checking systems typically operate by extracting a code sample from known and benign application program code. The code sample is stored together with information from the program file—such as the executable program header, the file length, and the date and time of the sample. The program file is checked at regular intervals against this database to ensure that the program file has not been modified. Integrity checking programs generate lists of modified files when a user upgrades the operating system of the computer or installs or upgrades application software.

A disadvantage of an integrity check-based malware detection system is that many warnings of malware activity may be generated when a modification to an application program is performed. It is often difficult for a user to determine when a warning represents a legitimate attack on the computer system. Another drawback of the integrity checking method is that the malicious code must modify other files in order to be detectable. The method, therefore, may only work with computer viruses and may not work with other forms of malicious code such as Internet worms and Trojan programs, which do not alter program files. Yet another disadvantage of the integrity checking method is that the malware (e.g., virus) must be activated on the target system. That is, the malware must be running in its memory and performing its infection function on the target computer's files in order to be detectable since changes to files only occur after the virus is activated.

Checksum monitoring systems typically detect malware by generating a cyclic redundancy check (CRC) value for each program file. Modification of the program file changes the CRC value for that file and it is that change that indicates infection of the program file. Checksum monitors improve on integrity check systems in that it is more difficult for malicious code to defeat the monitoring. On the other hand, checksum monitors exhibit the same limitations as integrity checking in that the method may generate false positives.

Another method for detecting malware is the use of bait files. This strategy may be used in combination with other malware detection strategies to detect an existing and active infection (i.e., the malicious code is presently running on the target computer and is modifying files). The virus is detected when the bait file is modified. Many viruses are created to avoid bait files and do not modify files that are either too small and are obviously bait files because of their structure, or have predetermined content in the file name.

Another malware detection method is referred to as sandboxing. This method is based on the fact that normal programs interact with the operating system through a set of predefined entry points referred to as application program interface (API) calls. The API calls are made to procedures located in memory whose entry points are maintained by the operating system and stored in an API table. Such an API table is typically present in each program space created under the operating system. In the sand-boxing method, the API table is replaced—in the program's process space only—with an API table that consists of pointers to the anti-virus protection shell that then monitors each API call before passing the call to the real operating system's API address.

This method has the drawback that the malicious code must be activated on the target computer's platform before detection can take place. Another drawback of this method is that it works only for those programs that employ the documented manner of calling the system's APIs. Many programs containing malicious code—including viruses, Internet worms, and Trojans—do not follow the standard convention and directly call the operating system at an address determined by scanning the operating system memory for an export table contained within the kernel and other standard system DLLs. Such programs are capable of immediately infecting the target computer during the sand-box examination process.

The above risks and malware protection limitations may result in a reluctance by customers to move to new cloud providers or even use cloud computing at all. Additional solutions are needed to make cloud hosting software, and in particular its important components such as the VMM, more secure from malware and code modifications.

In various embodiments, methods and systems are disclosed for monitoring executing software and using techniques such as behavior interception to detect malware activity. Such methods and systems may be used, for example, to detect malware activity in the VMM and other software components of cloud servers by interacting with the operating system of the server and monitoring for potentially malicious behavior.

Figure 3:
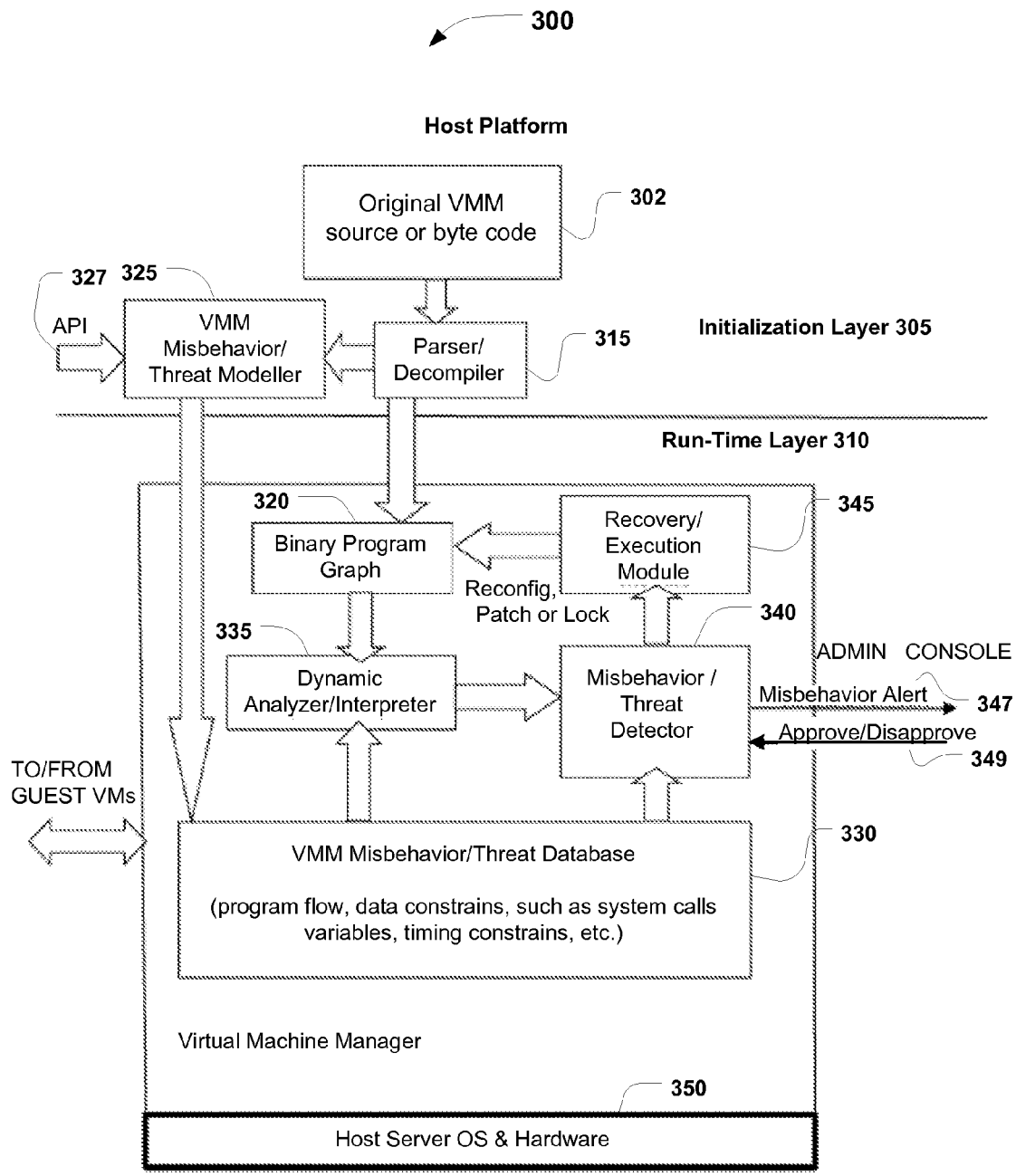
FIG. 3 illustrates an example system for malware monitoring.

FIG. 3 illustrates an example system for malware monitoring. In particular, FIG. 3 illustrates an example embodiment of a system 300 for the monitoring of executing software. In one embodiment, system 300 for the monitoring of executing software may comprise two layers—an initialization layer 305 and a run-time layer 310. As indicated above, the following examples describe embodiments including VMM software. However, the disclosed methods and systems may be applied to the detection of malware in other types of software.

Initialization layer 305 may include a static parser/decompiler 315 that may be configured to convert original source or byte code 302 of an existing VMM into a binary program graph 320 of the executable commands together with relevant connectors and data structures. The binary program graph 320 may be any structure that may be used to represent programming logic including Boolean functions and representations of sets or relations. In one embodiment, binary program graph 320 may be a tree data structure in which each node has up to two child nodes.

If the initial VMM is in the form of executable code, parser/decompiler 315 may generate corresponding source code, which may be loaded into a misbehavior/threat modeller 325.

Misbehavior/threat modeller 325 may receive code information and verify that system calls—along with their ranges of variables, data structures, and timing constraints—are included by the source code generated by misbehavior/threat modeller 325 and suitable for monitoring misbehavior (i.e., deviation from normal or expected behavior). In one embodiment, the code information may be received via an application programming interface (API) 327 from a programmer or analyst who has reviewed the code. The timing constraints data may be loaded into a misbehavior/threat database 330 and a binary flow tree may be loaded into binary program graph 320. A binary flow tree may be any data structure comprising nodes that may be used to indicate program flow. In an embodiment, the loading actions may be subject to programmer/analyst approval.

Run-time layer 310 may execute on a host server OS and hardware 350 and may include a dynamic analyzer/interpreter 335 that may match in real time the VMM program flow, data structures, and values against binary program graph 320 and misbehavior/threat database 330. When abnormal behavior (i.e., deviation from normal or expected behavior) is detected, the results may be provided to a misbehavior/threat detector 340.

When the VMM is compromised by malware or a malicious code modification, the VMM program's behavior may be changed. For example, the program flow may be changed. As another example, the value of system call variables may be changed and caused to operate out of range, causing buffer overflow. Additionally, a virtual hardware response may take longer than expected or longer than a known timing constraint. Other forms of misbehavior may be detected.

Misbehavior/threat detector 340 may generate and send an alert 347 in response to detection of the misbehavior. For example, an alert may be sent to an administrator console so that an administrator can approve or dismiss the alert via an approve/disapprove message 349. In some embodiments, misbehavior/threat detector 340 may trigger one or more actions to contain the malware threat and/or recover or repair the VMM program so that it may continue its intended operation. For example, an execution/recovery module 345 may be configured to generate a programming patch or reconfigure binary program graph 320 to correct the compromised situation. As another example, execution/recovery module 345 may lock the VMM from further execution.

In some cases the execution of the monitoring and recovery methods described above may result in some performance overhead. However, the performance trade-off may be considered acceptable for cloud servers that handle, for example, mission critical or sensitive data clients with special security and safety requirements.

Various embodiments implementing the methods disclosed herein may provide effective real time monitoring and protection of software, such as VMM software from malware and malicious code modification. Furthermore, cloud service providers or cloud computing software developers can automatically or semi-automatically convert or upgrade existing VMM software in order to add the above described monitoring features. The embodiments may be implemented on other components of cloud computing software, including operating systems and applications and any other software applications that may benefit from malware monitoring.

Additionally, the methods for monitoring executing software described herein may be used to monitor for unexpected program behavior arising from reasons other than malware. For example, data corruption may result in a change to a value or command that results in deviant program behavior that may in turn lead to a system fault or crash. By monitoring program execution for expected behavior as described herein, such faults may be detected and corrected or contained so that critical software may continue operation or damage can be minimized due to errant programs. Data can become corrupt for a variety of reasons such as power outages, harsh operating conditions, various natural phenomena, unexpected data inputs, or any other condition that may lead to unexpected software behavior. Software behavior monitoring techniques may be used to minimize the risk of faults and errant programs arising from such conditions.

Figure 4:
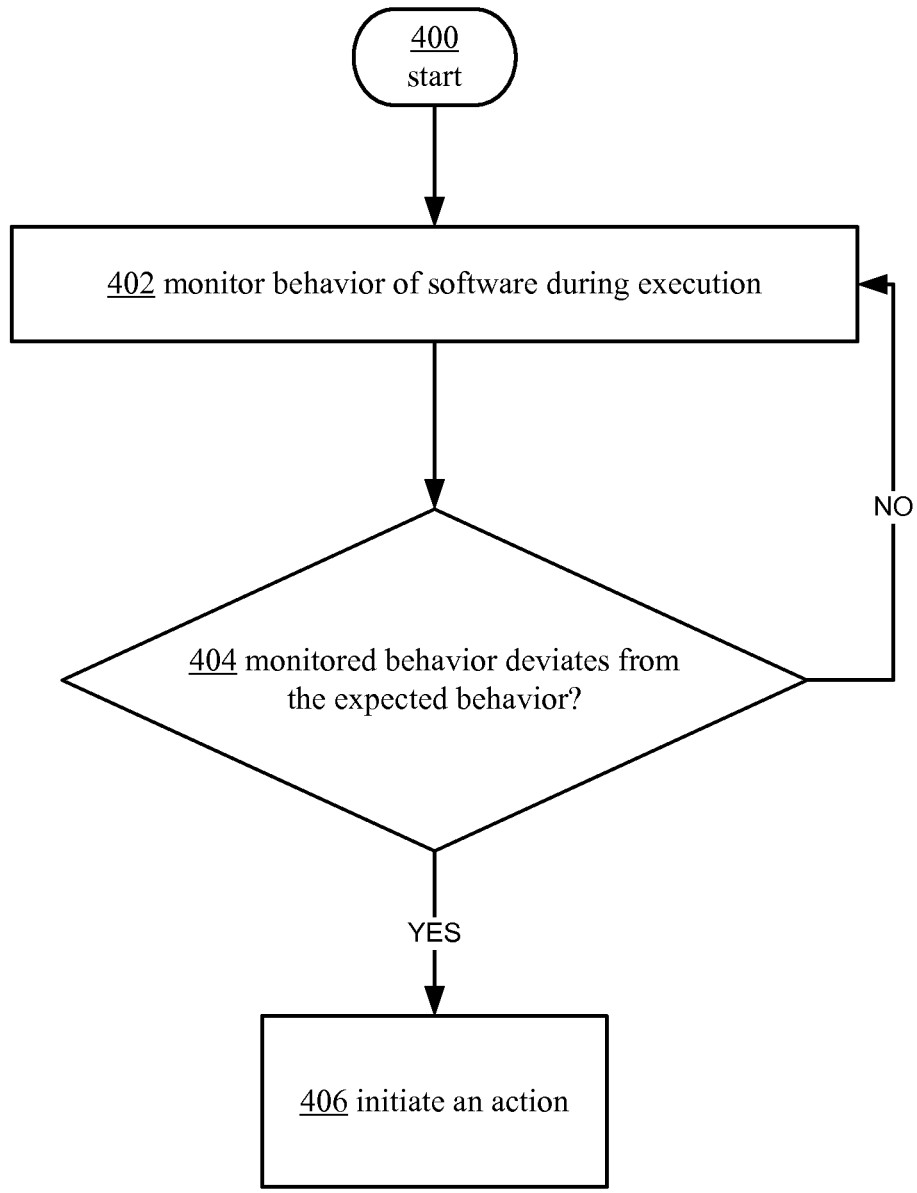
FIG. 4 illustrates an example of an operational procedure for monitoring executing software.

FIG. 4 illustrates an example of an operational procedure for monitoring executing software including operations 400, 402, 404, and 406. Referring to FIG. 4, operation 400 begins the operational procedure. Operation 400 may be followed by operation 402. Operation 402 (monitor behavior of software during execution) illustrates monitoring behavior of software during execution. Operation 402 may be followed by operation 404. Operation 404 (monitored behavior deviates from the expected behavior?) illustrates determining whether the monitored behavior deviates from the expected behavior. In an embodiment, the determining can be performed in accordance with a predetermined trigger. In one embodiment, the determination may be based on comparison of the monitored behavior and corresponding expected behavior derived from analysis of the software.

In some embodiments, the analysis may include conversion of source code or executable code into a binary program graph. The binary program graph may correspond to software program flow and may comprise data structures, connectors, and points to executable commands. The binary program graph may also be generated based on the source code conversion. In other embodiments, the analysis may comprise generation of a misbehavior/threat database based on the source code conversion. Additionally and optionally, the analysis may further consider information received via an application programming interface (API). Such information may be received, for example, from a programmer or analyst.

In some embodiments, the comparison of the monitored behavior and the corresponding expected behavior may be based on information received from the binary program graph and the misbehavior/threat database.

Additionally and optionally, the analysis may comprise parsing or decompilation of executable software into source code prior to execution of the executable software. The analysis may incorporate information to assist in ascertaining expected behavior of the monitored code. For example, the analysis may incorporate the information received via the API. In some embodiments, source code may be generated from the executable code, which may be used for the analysis.

In some embodiments, multiple binary program graphs may be generated. For example, in one embodiment a first binary program graph may be generated. The first binary program graph may be representative of the expected behavior of the software. A second binary program graph may be generated that is representative of the monitored behavior of the software. The first binary program graph and its associated data structures or values may be compared against the second binary program graph and its associated data structures or values to determine if the monitored behavior deviates from the expected behavior.

If it is determined that the monitored behavior deviates from the expected behavior in accordance with the predetermined trigger, then operation 404 may be followed by operation 406. Operation 406 (initiate an action) illustrates initiating an action in response to the determining. In one embodiment, the action can be initiated automatically. Otherwise, if it is determined that the monitored behavior does not deviate from the expected behavior in accordance with the predetermined trigger, then operation 404 may be followed by operation 402.

In one embodiment, the expected behavior may include correspondence between system calls and corresponding variables ranges, data structure ranges, and timing constraints. In some embodiments, determination that the monitored behavior deviates from the expected behavior may include matching software program flow and associated data structures or values against the binary program graph.

The predetermined trigger may include one or more conditions that may be used to determine the possible presence of malware. In some embodiments the predetermined trigger may include a change in the program flow. In other embodiments, the predetermined trigger may include an unexpected change in value of a system call variable, a variable value that is out of range, or a response timeout.

The action may include one or more steps taken by the monitoring software or other appropriate component in response to the determination that malware may be present. In some embodiments, the action may include sending an alert to an appropriate recipient such as an administrator. The action may also include steps to prevent the malware from harming the systems and data. For example, the action may include generating a programming patch, reconfiguring the binary program graph, and blocking further execution of the software.

Figure 5:
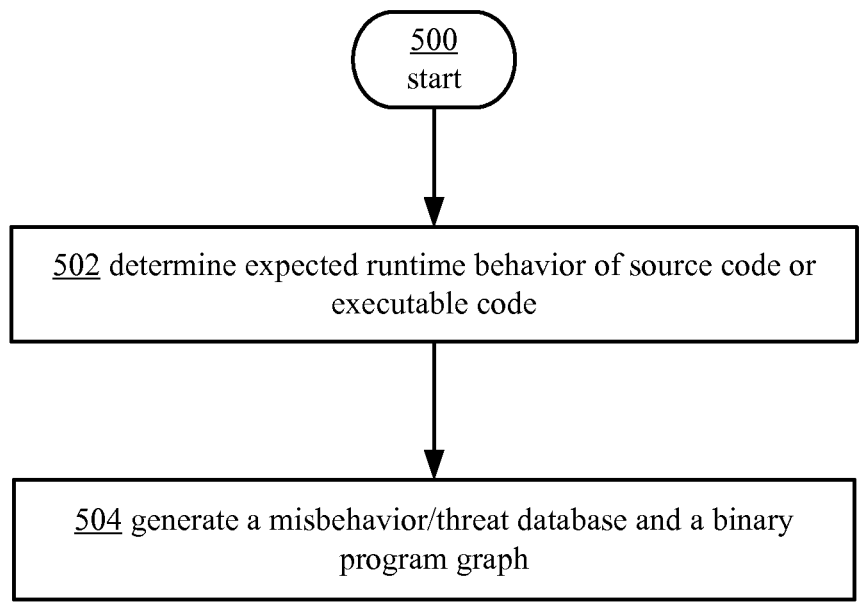
FIG. 5 illustrates an example of an operational procedure for monitoring executing software.

FIG. 5 illustrates an example of an operational procedure for monitoring executing software including operations 500, 502, and 504. Referring to FIG. 5, operation 500 begins the operational procedure. Operation 500 may be followed by operation 502. Operation 502 (determine expected runtime behavior of source code or executable code) illustrates determining expected runtime behavior of source code or executable code.

Operation 502 may be followed by operation 504. Operation 504 (generate a misbehavior/threat database and a binary program graph) illustrates generating a misbehavior/threat database and a binary program graph. The misbehavior/threat database and a binary program graph may be based on the expected runtime behavior of the source code or executable code. In one embodiment, an indication that monitored runtime behavior of the source code or executable code deviates from the expected runtime behavior can be generated based on comparison of the misbehavior/threat database and binary program graph with corresponding monitored runtime behavior.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one skilled in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, other different components. It is to be understood that such depicted architectures are merely examples, and that, in fact, many other architectures can be implemented to achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected"—or "operably coupled"—to each other to achieve the desired functionality, and any two components capable of being so associated can also be viewed as being "operably couplable" to each other to achieve the desired functionality. Specific examples of operably couplable include, but are not limited to, physically mateable and/or physically interacting components and/or wirelessly interactable and/or wirelessly interacting components and/or logically interacting and/or logically interactable components.

Figure 6:
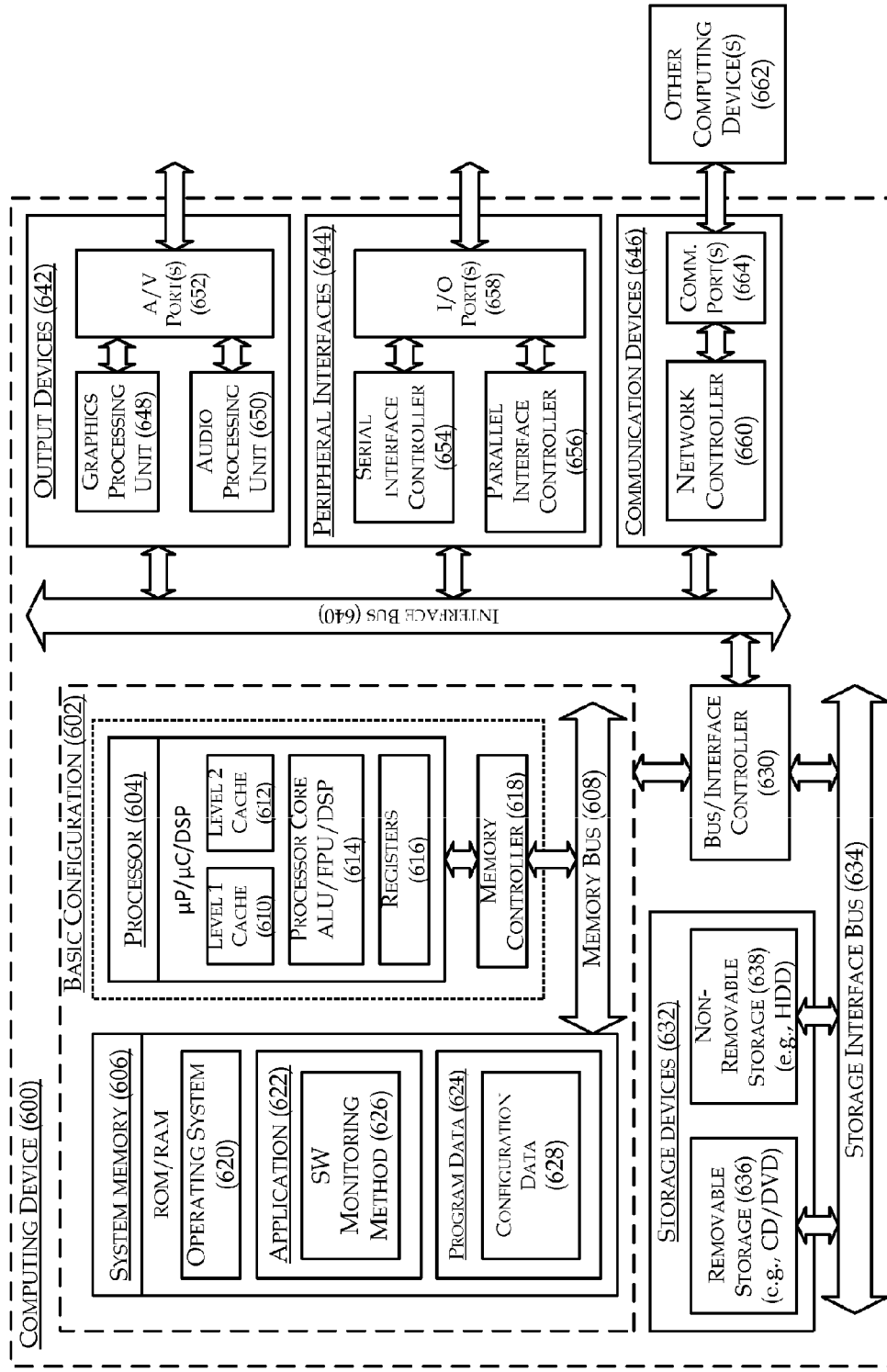
FIG. 6 depicts an example computing system wherein aspects of the present disclosure can be implemented.

FIG. 6 depicts an example computing system wherein aspects of the present disclosure can be implemented. In particular, FIG. 6 depicts a block diagram illustrating an example computing device 600 that is arranged for monitoring executing software in accordance with the present disclosure. In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor (µP), a microcontroller (µC), a digital signal processor (DSP), or any combination thereof. Processor 604 may include one or more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.), or any combination thereof. System memory 606 may include an operating system 620, one or more applications 622, and program data 624. Application 622 may include a software monitoring method 626 that is arranged to perform the functions as described herein including those described with respect to the processes described, for example, in FIGS. 4 and 5. Program data 624 may include configuration data 628 that may be useful for operation with the monitoring method described above. In some embodiments, application 622 may be arranged to operate with program data 624 on operating system 620 such that the implementations of software monitoring may be provided as described herein. This described basic configuration 602 is illustrated in FIG. 6 by those components within the inner dashed line.

Computing device 600 may have additional features or functionality and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile and removable and non-removable media implemented in any method or technology for storage of information, such as computer readable instructions, data structures, program modules, or other data.

System memory 606, removable storage devices 636, and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that may be used to store the desired information and that may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense that one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include, but not be limited to, systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third, and upper third, etc. As will also be understood by one skilled in the art all language such as "up to," "at least," and the like include the number recited and refer to ranges that can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A method for monitoring executing software, the method comprising:
    prior to execution of the software, accessing data indicative of expected behavior of the software, the expected behavior determined based on analysis of the software, wherein accessing data indicative of expected behavior of the software includes generating a first binary program graph that corresponds to source code level or executable code level program flow of the software, wherein the first binary program graph includes data structures, connectors, and executable commands; and
    during execution of the software:
        monitoring behavior of the software and comparing the monitored behavior with the data indicative of the expected behavior of the software, wherein monitoring behavior of the software includes generating a second binary program graph that corresponds to source code level or executable code level program flow of the software during execution, wherein the second binary program graph includes data structures, connectors, and executable commands;

determining whether the monitored behavior deviates from the expected behavior in accordance with a predetermined trigger, wherein determining whether the monitored behavior deviates from the expected behavior in accordance with the predetermined trigger comprises matching the second binary program graph of the software and associated data structures or values of the software with the first binary program graph of the software; and responsive to a determination that the monitored behavior deviates from the expected behavior in accordance with the predetermined trigger, automatically initiating an action.

2. The method of claim 1, wherein the analysis comprises decompilation of executable software into source code.

3. The method of claim 1, wherein the analysis comprises processing of information received via an Application Programming Interface (API).

4. The method of claim 1, wherein the analysis comprises parsing of source code prior to execution of the software.

5. The method of claim 1, wherein the analysis comprises generation of a misbehavior/threat database based on source code conversion and information received via an API.

6. The method of claim 3, wherein the analysis comprises generation of the first binary program graph based on source code conversion and the received information.

7. The method of claim 6, wherein the comparison is based on information received from the first binary program graph and a misbehavior/threat database.

8. The method of claim 1, wherein the expected behavior comprises interaction between system or other program calls and corresponding variables ranges, data structure ranges, and timing constraints.

9. The method of claim 1, wherein the predetermined trigger comprises a change in the program flow.

10. The method of claim 1, wherein the predetermined trigger comprises an unexpected change in value of a system call variable.

11. The method of claim 1, wherein the predetermined trigger comprises a variable value that is out of range.

12. The method of claim 1, wherein the predetermined trigger comprises a response timeout.

13. The method of claim 1, wherein the action comprises sending an alert.

14. The method of claim 1, wherein the action comprises generating a programming patch and inserting the programming patch into the software.

15. The method of claim 6, wherein the action comprises reconfiguring the binary program graph.

16. The method of claim 1, wherein the action comprises blocking further execution of the software.

17. The method of claim 1, wherein the software implements a virtual machine manager (VMM).

18. A computing system comprising:
a computing device comprising at least one processor;
a memory communicatively coupled to the processor when the system is operational, the memory having stored therein computer instructions that upon execution by the at least one processor cause:

prior to execution of software, accessing data indicative of modeled behavior of the software, the modeled behavior determined based on analysis of the software, wherein accessing data indicative of modeled behavior of software includes generating a first binary program graph that corresponds to source code level or executable code level program flow of the software, wherein the first binary program graph includes data structures, connectors, and executable commands; and during execution of the software:
monitoring behavior of the software to generate a second binary program graph that corresponds to source code level or executable code level program flow of the software during execution, wherein the second binary program graph includes data structures, connectors, and executable commands;

determining whether the monitored behavior deviates from the modeled behavior, wherein determining whether the monitored behavior deviates from the modeled behavior comprises matching the second binary program graph and associated data structures or values of the software with the first binary program graph of the software; and responsive to a determination that the monitored behavior deviates from the modeled behavior, initiating a response.

19. A non-transitory computer readable storage medium storing thereon computer executable instructions for monitoring executing software, the computer readable storage medium comprising:

instructions for, prior to execution of the software, accessing data indicative of modeled behavior of the software, the modeled behavior determined based on analysis of the software, wherein accessing data indicative of the modeled behavior includes generating a first binary program graph that corresponds to source code level or executable code level program flow of the software, wherein the first binary program graph includes data structures, connectors, and executable commands; and during execution of the software:
instructions for generating a misbehavior/threat database and a second binary program graph, the misbehavior/threat database and second binary program graph usable to generate an indication of monitored runtime behavior of the source code or executable code, wherein the second binary program graph corresponds to source code level or executable code level program flow of the software during execution, wherein the second binary program graph includes data structures, connectors, and executable commands; and instructions for determining expected runtime behavior of source code or executable code, wherein the instructions for determining include instructions for matching the second binary program graph and associated data structures or values of the software with the first binary program graph of the software.

20. The method of claim 1, wherein the matching comprises matching program flow of the software and associated data structures or values of the software with the first binary program graph in real-time.

21. The method of claim 1, wherein the matching comprises matching program flow of the software and associated data structures or values of the software with the first binary program graph and a misbehavior/threat database.

* * * * *